(12) United States Patent
Wang et al.

(10) Patent No.: US 11,370,344 B2
(45) Date of Patent: Jun. 28, 2022

(54) TILTING TRUCK BED AND DUMP TRUCK

(71) Applicant: XUZHOU XCMG MINING MACHINERY CO., LTD., Xuzhou (CN)

(72) Inventors: Daoming Wang, Xuzhou (CN); Jieshan Zhang, Xuzhou (CN); Hongyi Qin, Xuzhou (CN); Kuipu Qiao, Xuzhou (CN); Zhiming Tang, Xuzhou (CN)

(73) Assignee: XUZHOU XCMG MINING MACHINERY CO., LTD., Xuzhou (CN)

( * ) Notice: Subject to any disclaimer, the term of this patent is extended or adjusted under 35 U.S.C. 154(b) by 85 days.

(21) Appl. No.: 17/043,743

(22) PCT Filed: Aug. 16, 2019

(86) PCT No.: PCT/CN2019/101218
§ 371 (c)(1),
(2) Date: Sep. 30, 2020

(87) PCT Pub. No.: WO2020/035071
PCT Pub. Date: Feb. 20, 2020

(65) Prior Publication Data
US 2021/0053477 A1 Feb. 25, 2021

(30) Foreign Application Priority Data
Aug. 17, 2018 (CN) .......................... 201810941881.5

(51) Int. Cl.
*B60P 1/28* (2006.01)

(52) U.S. Cl.
CPC ...................................... *B60P 1/28* (2013.01)

(58) Field of Classification Search
CPC ................ B60S 5/00; B60P 1/283; B60P 1/28
(Continued)

(56) References Cited

U.S. PATENT DOCUMENTS 3,923,337 A * 12/1975 Kershaw .................. B60P 1/286
296/193.04
5,405,181 A * 4/1995 Watkins ................... B60P 1/283
298/17 B
(Continued)

FOREIGN PATENT DOCUMENTS

CN 104057861 A 9/2014
CN 104071064 A 10/2014
(Continued)

*Primary Examiner* — D Glenn Dayoan
*Assistant Examiner* — Sunsurraye Westbrook
(74) *Attorney, Agent, or Firm* — Bayramoglu Law Offices LLC (57) ABSTRACT

A tilting truck bed includes a bed body configured to load materials, lifting supports, shock absorber supports and a shock-absorbing pad assembly. The bed body includes a first bottom plate, a front plate, a tail plate, a left side plate, and a right side plate that are welded to upper edges of the first bottom plate. The lifting supports are symmetrically mounted on the tail plate and hinged to the frame to realize the tipping of the bed body. The shock absorber supports are symmetrically mounted on both sides of the front part of the first bottom plate, wherein the shock absorber support includes a shock absorber support main body and a gap adjusting device.

18 Claims, 9 Drawing Sheets

(58) Field of Classification Search
USPC ................ 298/17 r, 22 r, 18, 23 md, 24, 23 r
See application file for complete search history.

(56) References Cited

U.S. PATENT DOCUMENTS

| | | | |
|---|---|---|---|
| D721,988 S | * | 2/2015 | Graber .......................... D15/33 |
| 2004/0036245 A1 | * | 2/2004 | Mollhagen ........... B60K 17/046 |
| | | | 280/124.128 |

FOREIGN PATENT DOCUMENTS

| | | |
|---|---|---|
| CN | 204605950 U | 9/2015 |
| CN | 208855485 U | 5/2019 |
| CN | 208855487 U | 5/2019 |
| JP | 2016215916 A | 12/2016 |

\* cited by examiner

TILTING TRUCK BED AND DUMP TRUCK

CROSS REFERENCE TO THE RELATED APPLICATIONS

This application is the national phase entry of International Application No. PCT/CN2019/101218, filed on Aug. 16, 2019, which is based upon and claims priority to Chinese Patent Application No. 201810941881.5, filed on Aug. 17, 2018, the entire contents of which are incorporated herein by reference.

TECHNICAL FIELD

The present disclosure relates to a tilting truck bed and belongs to the field of dump trucks.

BACKGROUND

The truck bed is a main load-bearing component of a dump truck, and thus the overall performance of the dump truck depends critically on the structural design of the truck bed. However, conventional dump trucks have shortcomings such as complicated structure, poor manufacturability, heaviness, poor reliability, high cost, material adhering to the bed's surface, and insufficient load capacity.

The shock absorber support is also a crucial load-bearing component that secures the shock absorber to the truck and bears the impact generated when the truck bed falls and during travel of the truck over the road surface. Therefore, the shock absorber support must have sufficient strength and stiffness, and the structural design of the shock absorber support is critical to the overall performance of the dump truck. Shock absorber supports of conventional dump trucks, however, have the shortcomings of complicated structure, poor manufacturability, insufficient structural strength, and poor reliability.

SUMMARY

The present disclosure provides a tilting truck bed to solve the shortcomings existing in the prior art.

The present disclosure is implemented according to the following technical solutions:

A tilting truck bed includes:

A bed body, configured to load materials, wherein the bed body includes a bottom plate I, a front plate, a tail plate, a left side plate, and a right side plate that are welded to upper edges of the bottom plate I;

lifting supports, symmetrically mounted on the tail plate and hinged to the frame to tilt the bed body;

shock absorber supports, symmetrically mounted on both sides of the front part of the bottom plate I, wherein the shock absorber support includes a shock absorber support main body and a gap adjusting device, and a gap between the frame and the shock absorber support is adjusted by the gap adjusting device to control the lateral displacement generated by the truck bed during the running process, which realizes the function of limiting the lateral displacement; and a shock-absorbing pad assembly, mounted on the shock absorber supports and configured to reduce the impact on the frame when the truck bed falls.

Further, the lifting supports include:

a U-shaped plate, hermetically welded on the outer wall of the tail plate;

two support bases, oppositely welded on both sides of the U-shaped plate;

a shaft, inserted in the two support bases and bearings on the frame; and a fastening assembly, configured to limit the shaft in the two support bases.

Further, the fastening assembly includes a fixing plate, a pressure plate, two screws, and two threaded bases. The fixing plate is welded to one end of the shaft, and the two threaded bases are spaced apart and welded to each of the two support bases. After the shaft is inserted into the two support bases, the protrusion in the fixing plate is located between the two threaded bases, and the pressure plate is fastened to the two threaded bases by screws to limit the shaft in the two support bases. After the pressure plate is mounted, a gap is reserved between the pressure plate and the shaft to avoid directly applying a force on the pressure plate by means of allowing a predetermined axial displacement of the shaft.

Further, the shock absorber support main body includes a shock-absorbing pad mounting plate, a front vertical plate, a rear vertical plate, a side plate, a back plate, and a bottom plate II. A rectangular hole is formed on the shock-absorbing pad mounting plate, the front vertical plate, the back vertical plate, the side plate, and the back plate are inserted into the rectangular hole of the shock-absorbing pad mounting plate. An enclosed box-shaped support structure is form by the front vertical plate, the back vertical plate, the side plate, and the back plate together with the bottom plate II. The back plate faces the frame, and the side plate is parallel to the back plate. The side plate is not in contact with the bottom plate II, and a gap for assembling the gap adjusting device is reserved between the side plate and the bottom plate II.

Further, the gap adjusting device includes a right-angled adjusting plate, an adjusting assembly, and a fastening assembly. The bending surface I of the adjusting plate is located in front of the back plate, and the bending surface II of the adjusting plate is located below the bottom plate II. After the gap between the adjusting plate and the frame is adjusted by the adjusting assembly, an adjusting pad is filled between the bending surface I of the adjusting plate and the back plate, and then, the bending surface II of the adjusting plate is mounted on the bottom plate II by the fastening assembly.

Further, the fastening assembly includes at least one fastening bolt and at least one fastening nut, and oblong holes formed on the bottom plate II. After the fastening bolts successively pass through the through-holes on the adjusting plate and the oblong holes on the bottom plate II, the gap between the adjusting plate and the back plate is adjusted, and the adjusting plate is fixed on the bottom plate II by the fastening bolts matched with the fastening nuts.

Further, the adjusting assembly includes at least one adjusting bolt and at least one adjusting nut. The adjusting nuts are welded on the back plate, and the gap between the bending surface I of the adjusting plate and the frame is adjusted by screwing or unscrewing the adjusting bolts in the adjusting nuts.

Further, a truck bed tailgate device is arranged at the tail of the bed body. The truck bed tailgate device includes a U-shaped plate frame composed of a plate I and two plates II that are symmetrically arranged, two chains and two mounting bases.

One of the two plates II is hinged on the left side plate by a rotating assembly, and the other one of the two plates II is hinged on the right side plate by the rotating assembly. The two mounting bases are symmetrically mounted on two sides of the bed body. One end of the chain is hinged to the plate II by a shaft pin, and the other end of the chain is hinged to the mounting base by a connecting plate. During the lifting process, a lateral tensile force is generated by a tilt angle of the two chains to limit the U-shaped plate frame, and the materials are unloaded by changing the tipping angle of the truck bed.

Further, the rotating assembly includes a rotating base mounted on the bed body, and the rotating base is provided with a through-hole.

The rotating assembly further includes a rotating shaft, a shaft sleeve, an end cover, a washer and a bolt, and the rotating shaft, the shaft sleeve, the end cover, the washer, the bolt and the through-hole are coaxially arranged in sequence. The washer is fastened on the end cover by the bolt from the outer side. The contact surface between the end cover and the rotating shaft is provided with a convex structure and a concave structure that are engaged with each other. The washer is mounted in a groove of the end cover. The rotating shaft is fixed on the mounting plate, and the outer diameter of the rotating shaft is equal to the diameter of the through-hole.

A dump truck includes the tilting truck bed mentioned above.

The present disclosure has the following advantages.

The shock absorber support of the present disclosure is configured to both mount the shock-absorbing pad assembly thereon and limit the lateral displacement of the truck bed.

The shaft is limited by the pressure plate, and the pressure plate is mounted on the lifting support by bolts. After the pressure plate is mounted, a 5 mm gap is reserved between the pressure plate and the pin shaft to allow an axial displacement of the pin shaft, which avoids the direct load bearing of the pressure plate, thereby achieving a secure connection.

The shock-absorbing pad assembly is configured to reduce the impact on the frame when the truck bed falls and during travel. The shock-absorbing pad assembly is mounted on the shock absorber supports by bolts to facilitate assembly and disassembly.

The gap adjustment of the frame is realized by the gap adjusting device to effectively control the lateral displacement generated by the truck bed during the running process of the vehicle to realize the function of limiting the lateral displacement.

During the lifting process, a lateral tensile force is generated by a tilt angle between the two chains to limit the U-shaped plate frame, and an opening between the U-shaped plate frame and the tail plate rapidly enlarges as the tipping angle of the truck bed changes, thereby improving the unloading speed of the dump truck.

Reference numerals of the drawings: 1. brim; 2. front plate; 3. right side plate; 4. right U-shaped plate; 5. right web plate; 6. bottom plate I; 7. bottom web plate; 8. tail plate; 9. tail web plate; 10. left side plate; 11, left U-shaped plate; 12. left web plate; 13. rotating assembly; 13-1. rotating shaft; 13-2. shaft sleeve; 13-3 end cover; 13-4. washer; 13-5. bolt; 13-6. rotating base; 14. chain; 15. shaft pin; 16. mounting base; 17. truck bed tailgate device; 18. lifting support; 18-1. U-shaped plate; 18-2. support base; 18-3. shaft; 18-4. fixing plate; 18-5. pressure plate; 18-6. screw; 18-7. threaded base; 19 support frame; 20. connecting plate; 100. bed body; 200. frame; 300. shock absorber support; 400. shock-absorbing pad assembly; 301. shock-absorbing pad mounting plate; 302. front vertical plate; 303. rear vertical plate; 304. side plate; 305. back plate; 306. bottom plate II; 307. adjusting plate; 308. thick adjusting pad; 309. thin adjusting pad; 3010. fastening bolt; 3011. sleeve; 3012. gasket; 3013. disc washer; 3014. fastening nut; 3015. adjusting bolt; 3016. adjusting nut.

DETAILED DESCRIPTION OF THE EMBODIMENTS

In order to clearly describe the objectives, technical solutions, and advantages of the present disclosure, the technical solutions in the embodiments of the present disclosure will be described in detail hereinafter with reference to the drawings. In the drawings, the same or similar reference numerals denote the same or similar elements or elements having the same or similar functions throughout. The described embodiments are a part of embodiments of the present disclosure rather than all the embodiments. The illustrative embodiments described hereinafter with reference to the drawings are intended to illustrate the present disclosure and should not be construed as limiting the present disclosure. Based on the embodiments of the present disclosure shown and described, all other embodiments obtained by those having ordinary skill in the art without creative efforts shall fall within the scope of protection of the present disclosure. The embodiments of the present disclosure will be described in detail hereinafter with reference to the drawings.

Figure 1:
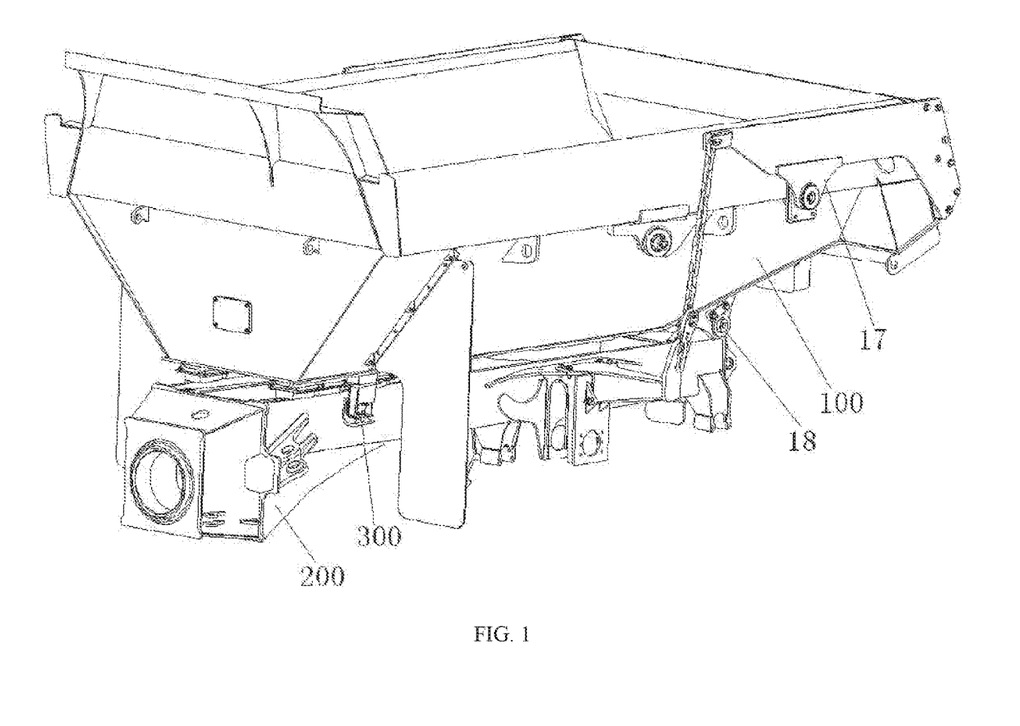
FIG. 1 is a schematic diagram showing the mounting position of the truck bed of the present disclosure.

As shown in FIG. 1, a tilting truck bed includes the bed body 100, the lifting supports 18 symmetrically mounted on the tail plate, the shock absorber supports 300 symmetrically mounted on both sides of the front part of the bottom plate I 6, and the shock-absorbing pad assembly 400. The bed body 100 is configured to load materials and includes the bottom plate I 6, the front plate 2, the tail plate 8, the left side plate 10, and the right side plate 3. The front plate 2, the tail plate 8, the left side plate 10, and the right side plate 3 are welded to the upper edges of the bottom plate 16. The lifting support 18 is hinged to the frame 200 to lift the bed body 100. The shock absorber supports 300 include a shock absorber support main body and a gap adjusting device, and a gap adjustment of the frame 200 is realized by the gap adjusting device to control the lateral displacement generated by the truck bed during the running process to realize the function of limiting the lateral displacement. The shock-absorbing pad assembly 400 is mounted on the shock absorber supports 300 and configured to reduce the impact on the frame when the truck bed falls.

Figure 2:
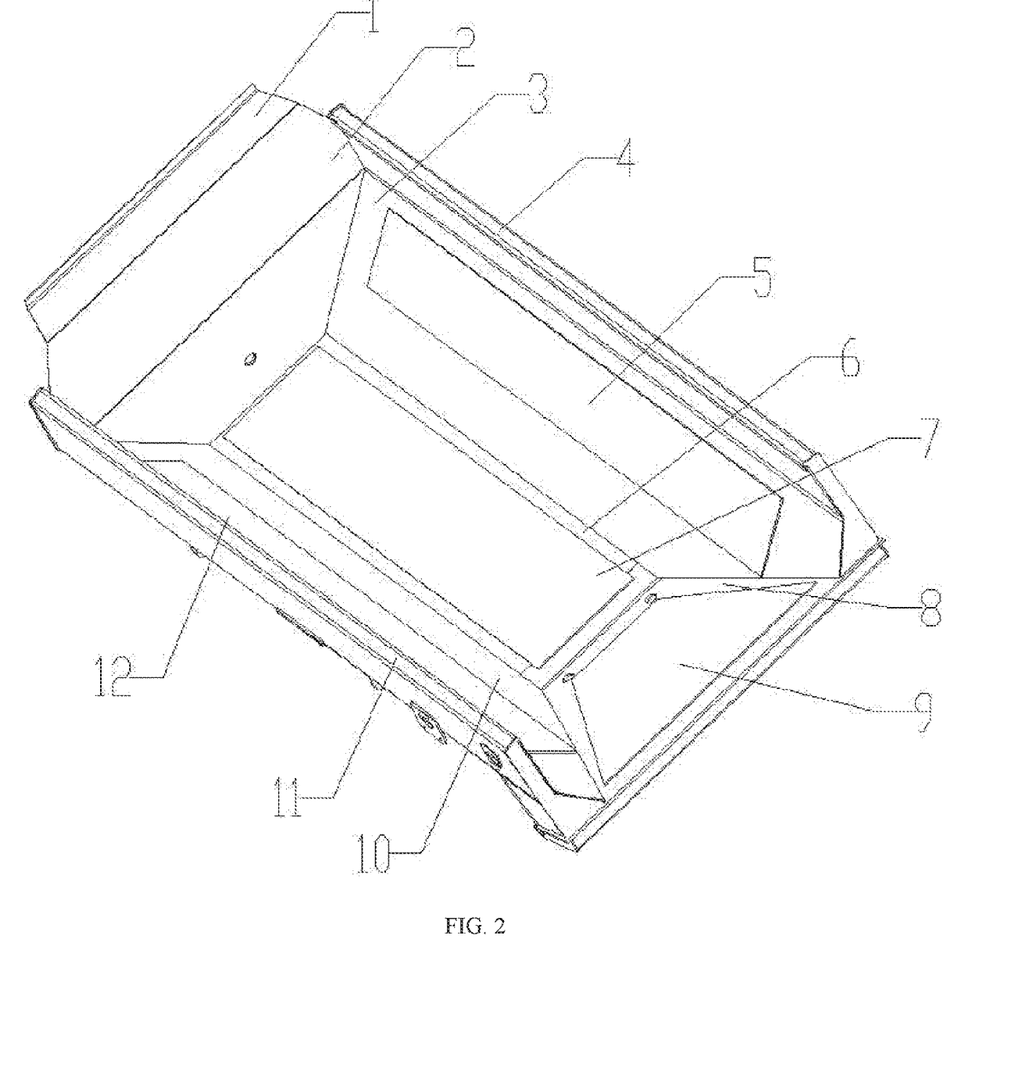
FIG. 2 is a structural schematic diagram of the bed body of the present disclosure.

As shown in FIG. 2, the left web plate 12 is welded on the inner wall of the left side plate 10. The right web plate 5 is welded on the inner wall of the right side plate 3. The bottom web plate 7 is welded on the inner wall of the bottom plate I 6. The tail web plate 9 is welded on the inner wall of the tail plate 8. The multiple web plates are welded to reduce cost and provide good abrasion resistance for the bed body, thereby substantially improving the service life of the truck bed.

The left U-shaped plate 11 is welded on the lateral side of the top of the left side plate 10. The right U-shaped plate 4 is welded on the lateral side of the top of the right side plate 3. A box-shaped cavity support structure is constructed to provide a structural support for the side plate of the bed body.

It should be noted that in the above-mentioned embodiment, the left side plate 10 and the right side plate 3 are symmetrically welded to both sides of the bottom plate I 6, and the included angles between the left side plate 10 and the bottom plate I 6, and between the right side plate 3 and the bottom plate I 6 are greater than 90 degrees. The bottom edge of the front plate 2 is welded to the front edge of the bottom plate I 6, and the included angle between the front plate 2 and the bottom plate I 6 is greater than 90 degrees. The two sides of the front plate 2 are welded to the inner sides of the left side plate and the right side plate. The bottom edge of the tail plate 8 is welded to the rear edge of the bottom plate I 6, and the included angle between the tail plate 8 and the bottom plate I 6 is greater than 90 degrees. Both sides of the bottom plate I 6 are welded to the inner sides of the left side plate and the right side plate. The brim 1 is welded to the front plate 2.

The main body of the bed body 100 (except the web plates) is made of Q690E steel having optimal strength and stiffness, and improved low-temperature impact resistance. Compared to traditional truck beds, the material of the bed body 100 is thinner to reduce the weight of the truck bed, thereby realizing a lightweight design and effectively improving the net cargo dead weight. The right web 5, the bottom web plate 7, the tail web plate 9 and the left web plate 12 are all wear-resistant plates (NM400) having a hardness of 400 HB.

Figure 3:
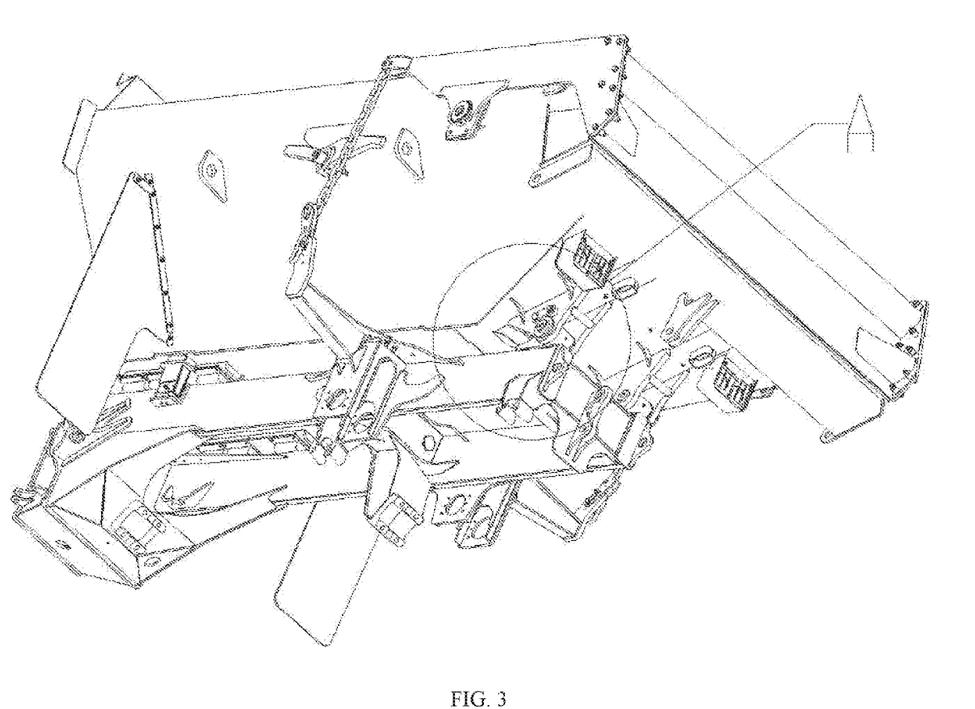
FIG. 3 is a schematic diagram showing the mounting position of the lifting support of the present disclosure.
Figure 4:
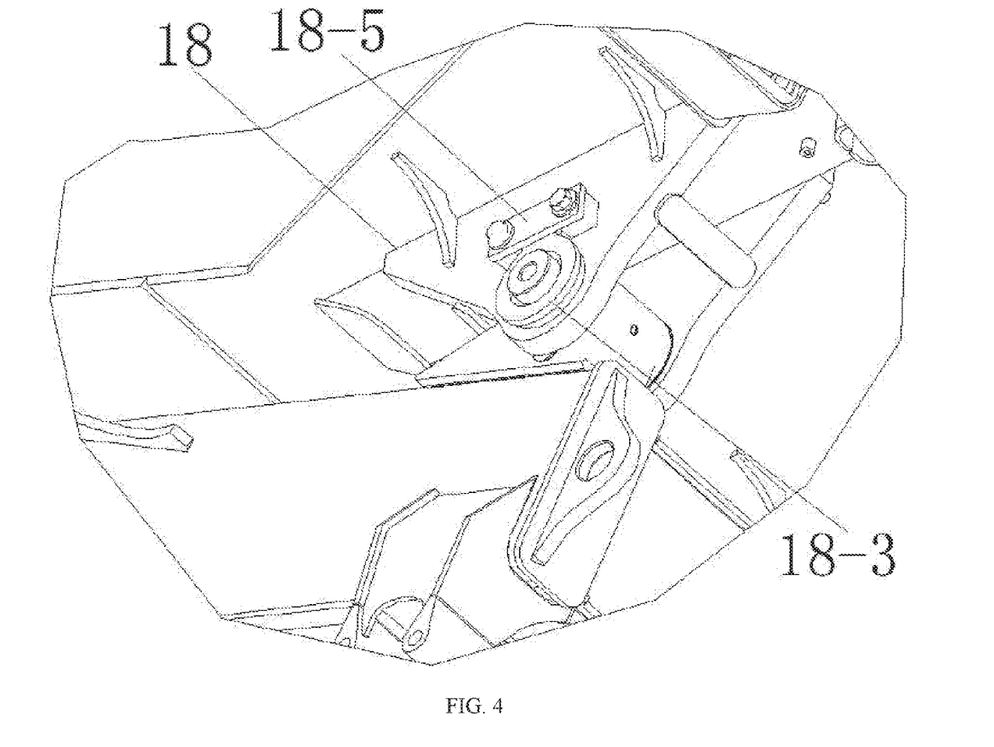
FIG. 4 is an enlarged view of the portion A in FIG. 3.

As shown in FIG. 3 and FIG. 4, the lifting support 18 includes the U-shaped plate 18-1, two support bases 18-2, the shaft 18-3, and the fastening assembly. The U-shaped plate 18-1 is hermetically welded on the outer wall of the tail plate 8. The two support bases 18-2 are oppositely welded on both sides of the U-shaped plate 18-1. The shaft 18-3 is inserted in the two support bases 18-2 and the bearings on the frame 200. The fastening assembly is configured to limit the shaft 18-3 in the two support bases 18-2.

A preferred embodiment of the fastening assembly in the above-mentioned embodiment is provided as follows.

Figure 5:
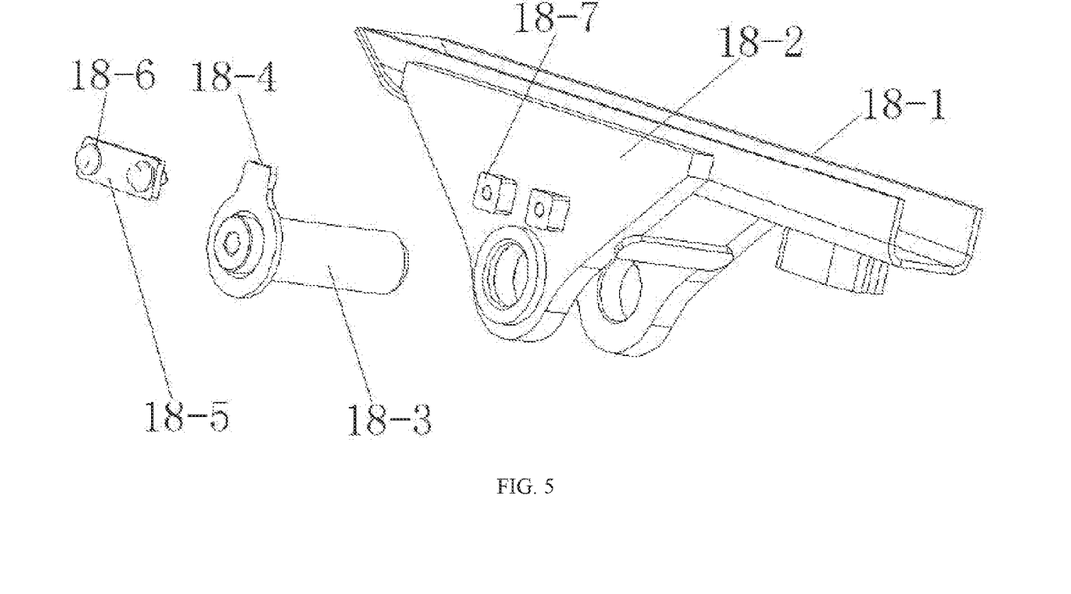
FIG. 5 is an exploded view of the installation of the lifting support of the present disclosure.

As shown in FIG. 5, the fastening assembly includes the fixing plate 18-4, the pressure plate 18-5, two screws 18-6, and two threaded bases 18-7.

The fixing plate 18-4 is welded to one end of the shaft 18-3, and the two threaded bases 18-7 are spaced apart and welded to each of the two support bases 18-2. When the shaft 18-3 is inserted into the two support bases 18-2, the protrusion in the fixing plate 18-4 is located between the two threaded bases 18-7, and the pressure plate 18-5 is fastened on the two threaded bases 18-7 by the two screws 18-6, to limit the shaft 18-3 in the two support bases 18-2.

It should be noted that, after the pressure plate 18-5 is mounted, a 5 mm gap is reserved between the pressure plate 18-5 and the shaft 18-3 to avoid the direct bearing force on the pressure plate 18-5 by means of allowing a predetermined axial displacement of the shaft 18-3.

Figure 6:
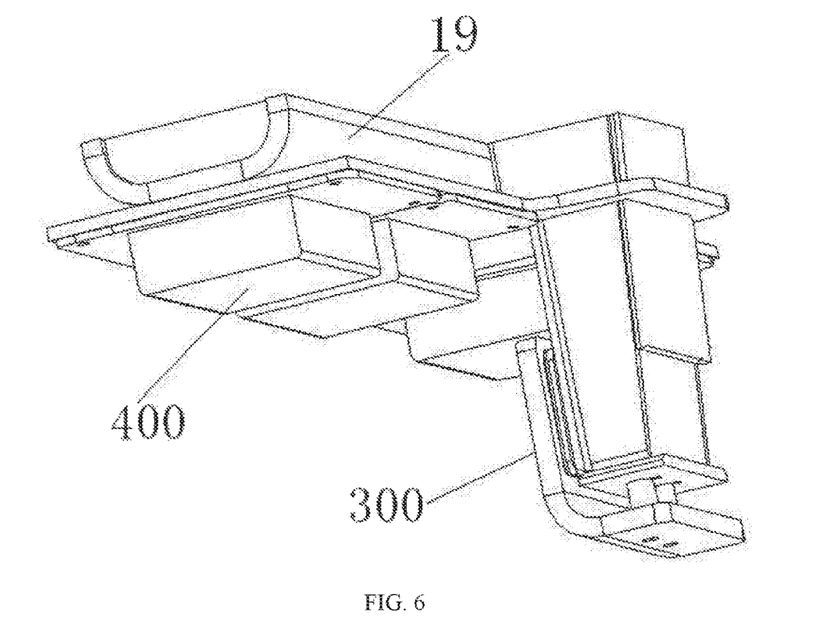
FIG. 6 is a schematic diagram showing the installation of the shock-absorbing pad assembly and the shock absorber support of the present disclosure.

As shown in FIG. 6, the number of the shock absorber supports 300 is two, and the two shock absorber supports 300 are symmetrically welded below the bottom plate of the bed body 100 on the left side and the right side, respectively.

Certainly, the number of the shock absorber supports 300 can be four, i.e. two shock absorber supports on the left and two shock absorber supports on the right.

Figure 10:
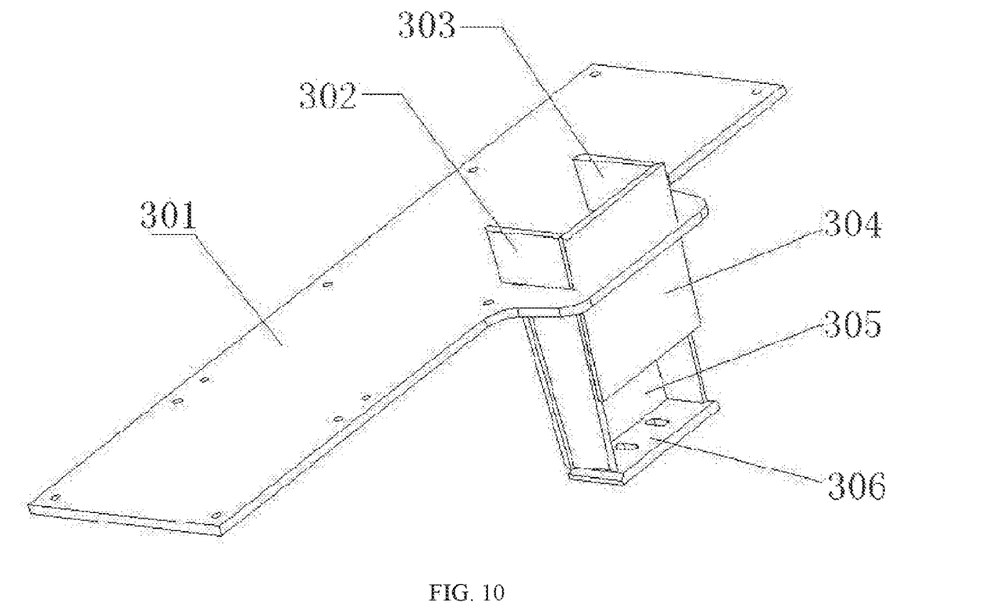
FIG. 10 is a structural schematic diagram of the main body of the shock absorber support of the present disclosure.

As shown in FIG. 10, the main body of the shock absorber support includes the shock-absorbing pad mounting plate 301, the front vertical plate 302, the rear vertical plate 303, the side plate 304, the back plate 305, and the bottom plate II 306. The top surface of the shock-absorbing pad mounting plate 301 is welded to the support frame 19 located under the bottom plate of the truck bed 100. The front vertical plate 302, the rear vertical plate 303, the side plate 304, the back plate 305, and the bottom plate II 306 form a box-shaped structure and are welded to the bottom surface of the shock-absorbing pad mounting plate 301. The back plate 305 faces the frame 200, and the side plate 304 is parallel to the back plate 305. The side plate 304 is not in contact with the bottom plate 306, reserving a gap between the side plate 304 and the bottom plate 306 to facilitate assembling the gap adjusting device.

It should be noted that, in the above-mentioned embodiment, the front vertical plate 302, the rear vertical plate 303, and the side plate 304 penetrate through the bottom surface of the shock-absorbing pad mounting plate 301 and extend upward through a preset distance. The sides of the extended front vertical plate 302 and rear vertical plate 303 are welded to the support frame 19, respectively. The top surfaces of the extended front vertical plate 302, rear vertical plate 303, and side plate 304 are welded to the bottom plate of the bed body 100, respectively. The shock absorber support 300 can reach a higher strength and stiffness by limiting the structural displacement in combination with circumferential welding.

Figure 7:
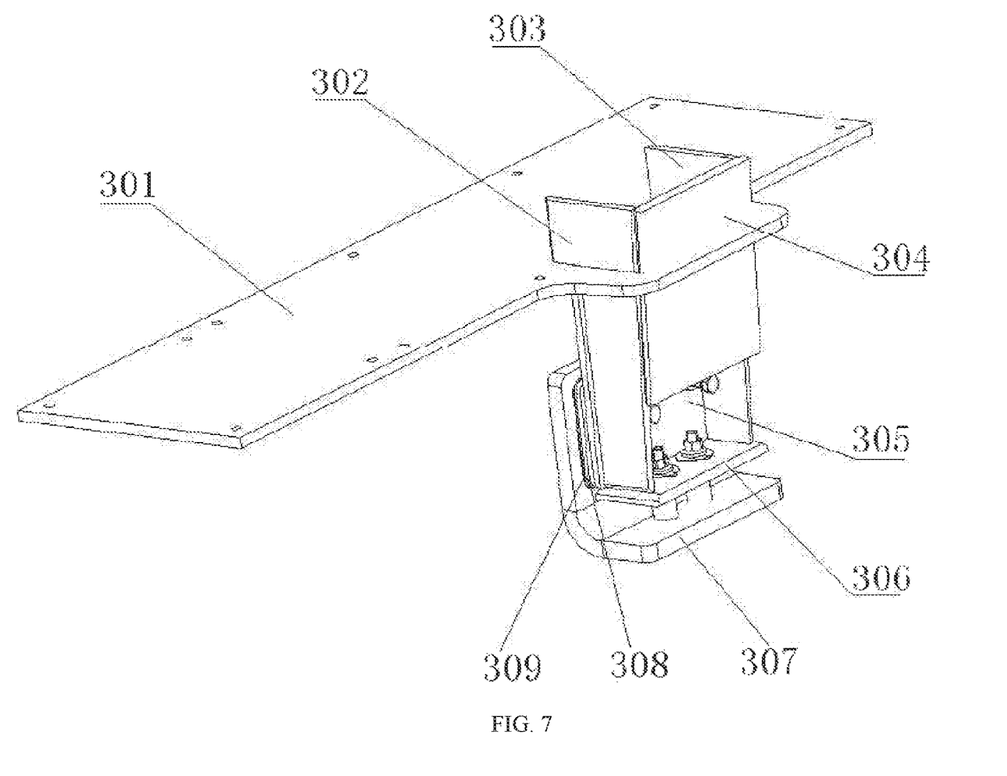
FIG. 7 is a structural schematic diagram of the shock absorber support of the present disclosure.
Figure 8:
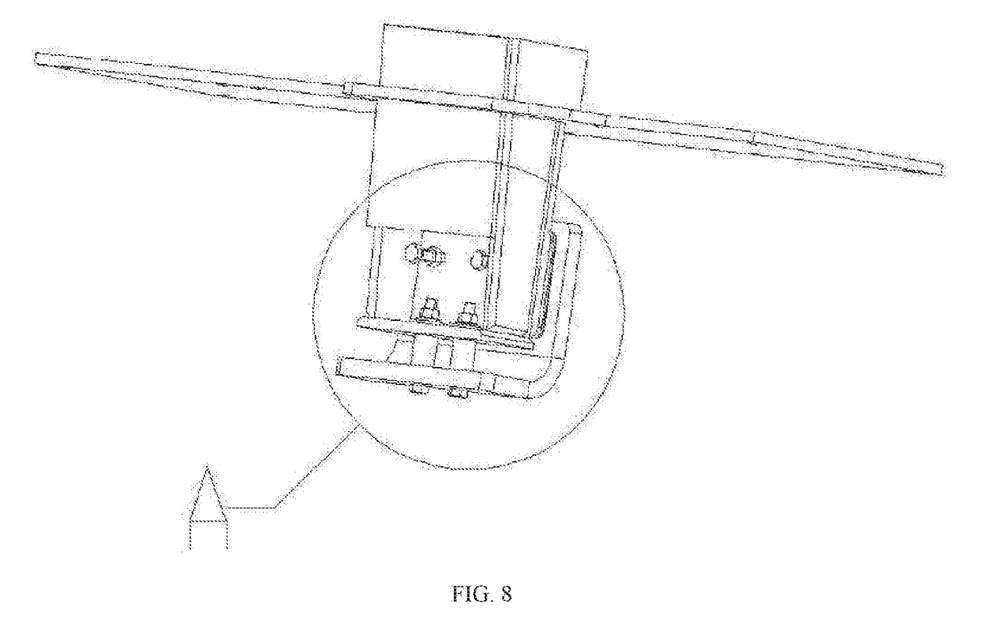
FIG. 8 is a structural schematic diagram of the shock absorber support of the present disclosure from another angle.
Figure 9:
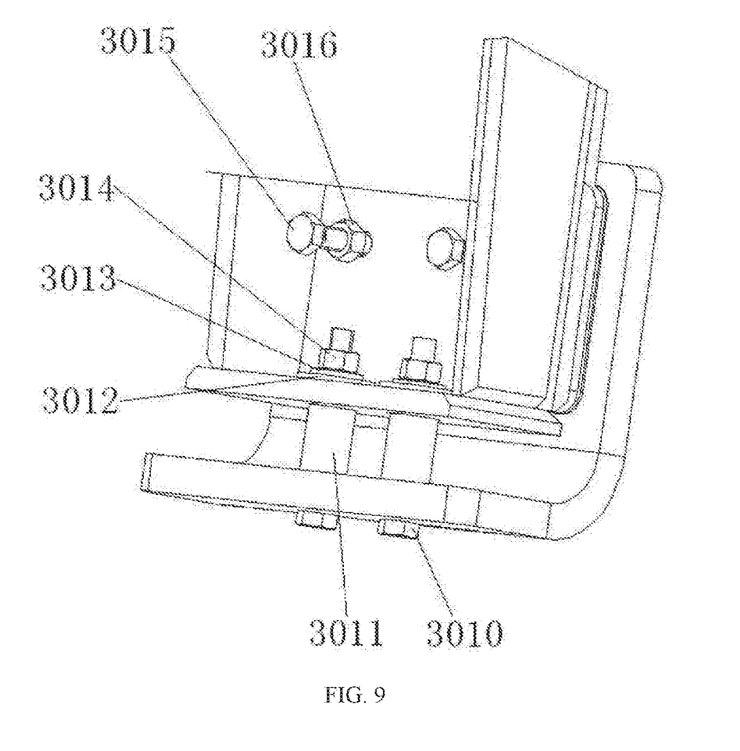
FIG. 9 is an enlarged view of the portion A in FIG. 8.

As shown in FIG. 7, FIG. 8, and FIG. 9, the gap adjusting device includes the right-angled adjusting plate 307, the adjusting assembly, and the fastening assembly. The bending surface I of the adjusting plate 307 is located in front of the back plate 305, and the bending surface II of the adjusting plate 307 is located below the bottom plate II 306. After the gap between the adjusting plate 307 and the frame 200 is adjusted by the adjustment assembly, an adjustment pad is filled between the bending surface I of the adjusting plate 307 and the back plate 305, and then, the bending surface II of the adjusting plate 307 is mounted on the bottom plate II 306 by the fastening assembly.

A preferred embodiment of the fastening assembly and the adjustment assembly is provided as follows.

The fastening assembly includes at least one fastening bolt 3010 and at least one fastening nut 3014, and oblong holes on the bottom plate II 306. After the fastening bolt 3010 successively passes through the through-hole on the adjusting plate 307 and the oblong hole on the bottom plate II 306, the gap between the adjusting plate 307 and the back plate 305 is adjusted, and the adjusting plate 307 is fixed on the bottom plate 306 by the fastening nut 3014 and the fastening bolt 3010 that are matched with one another.

The adjusting assembly includes at least one adjusting bolt 3015 and at least one adjusting nut 3016. The adjusting nut 3016 is welded to the back plate 305, and the gap between the bending surface I of the adjusting plate 307 and the frame 200 is adjusted by screwing or unscrewing the adjusting bolt 3015 in the adjusting nut 3016.

It should be noted that, in the above-mentioned embodiment, the adjustment pad includes the thick adjustment pad 308 and the thin adjustment pad 309. A certain number of thick adjustment pads 308 and thin adjustment pads 309 are mounted according to an adjusted gap between the adjusting plate 307 and the back plate 305.

After the washer 3012 and the disc washer 3013 are sleeved on the fastening bolt 3010, the adjusting plate 307 is fixed on the bottom plate II 306 by the fastening nut 3014 and the fastening bolt 3010 that are matched with one another.

Two sets of fastening bolts 3010 and fastening nuts 3014 are preferred, and two sets of adjustment bolts 3015 and adjustment nuts 3016 are preferred.

Referring to FIG. 7, FIG. 8, and FIG. 9, the sleeve 3011 is sleeved in the fastening bolt 3010 between the bottom plate II 306 and the adjusting plate 307. The sleeve 3011 provides a limit and support for the adjusting plate 307 to ensure a uniform gap between the adjusting plate 307 and the frame 200.

As shown in FIG. 6, at least one shock-absorbing pad assembly 400 is mounted on each shock absorber support 300 and configured to reduce the impact on the frame 200 when the bed body 100 falls. The shock-absorbing pad assembly 400 is mounted at a mounting hole corresponding to the shock absorber support 300 by bolts.

It should be noted that, in the above-mentioned embodiment, three shock-absorbing pad assemblies 400 are mounted on each shock absorber support 300. Optionally, the number of the shock-absorbing pad assemblies 400 can also be four or five.

It can be seen that the shock-absorbing pad assembly 400 is configured to reduce the impact on the frame 200 when the truck bed 100 falls, and is mounted on the shock absorber support 300 by bolts to facilitate the disassembly and assembly of the shock-absorbing pad assembly 400.

Figure 11:
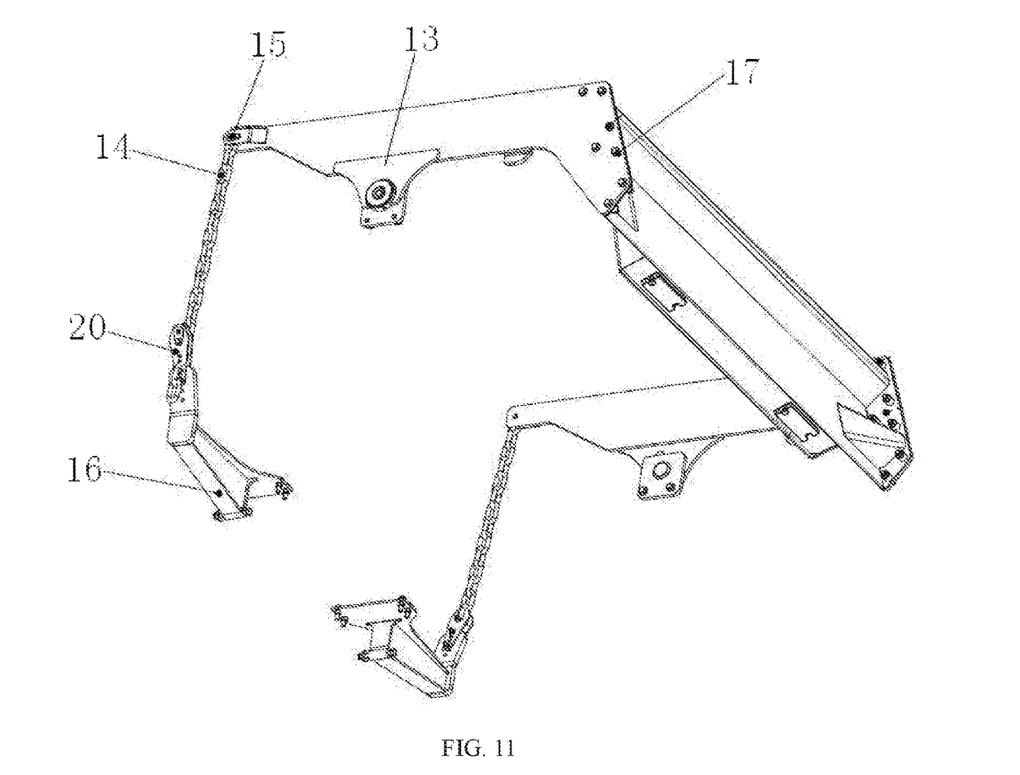
FIG. 11 is a structural schematic diagram of the truck bed tailgate device of the present disclosure.
Figure 12:
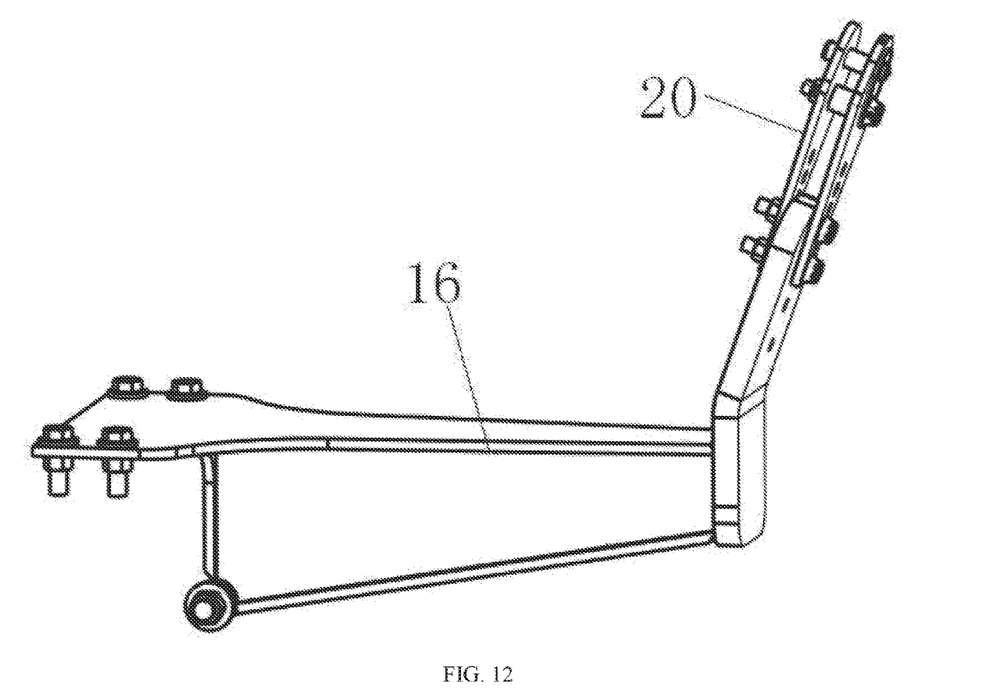
FIG. 12 is a structural schematic diagram of the mounting base and the connecting plate according to the present disclosure.
Figure 13:
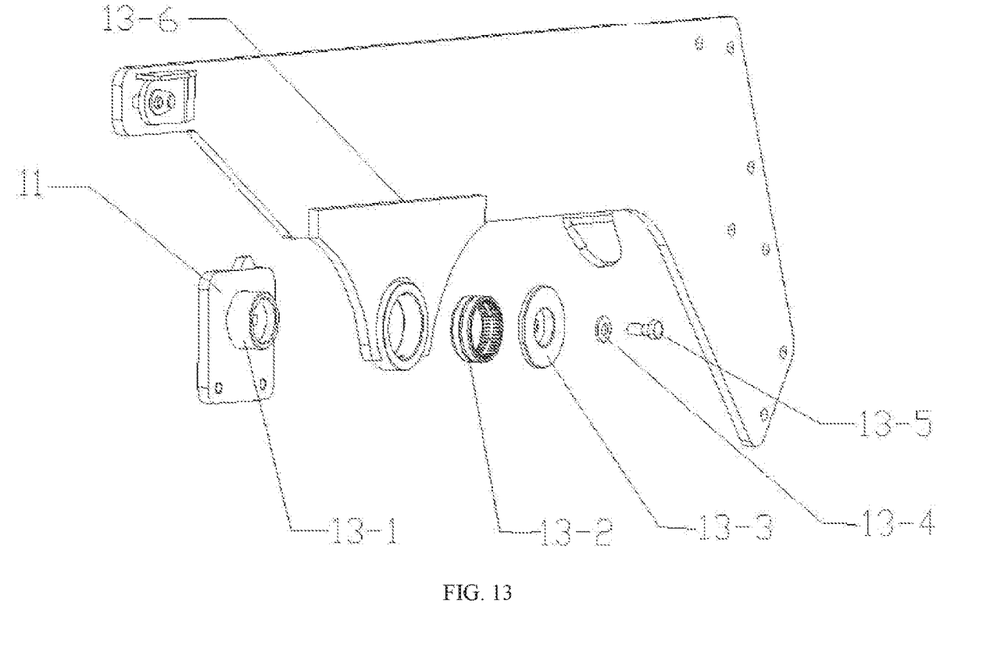
FIG. 13 is an exploded view showing the structure of the rotating assembly of the present disclosure.

As shown in FIG. 11 and FIG. 13, the truck bed tailgate device includes a U-shaped plate frame composed of the plate I and two plates II arranged symmetrically, two chains, and two mounting bases. One of the two plates II is hinged on the left side plate by the rotation assembly, and the other one of the two plates II is hinged on the right side plate by the rotating assembly. The two mounting bases are symmetrically mounted on both sides of the bed body. One end of the chain is hinged to the plate II by a shaft pin, and the other end of the chain is hinged to the mounting base by a connecting plate. During the lifting process, the position of the U-shaped plate is limited by a lateral tensile force generated by a tilt angle of the two chains, and the materials are unloaded by changing the tipping angle of the truck bed.

A preferred embodiment of the rotating assembly in the above-mentioned embodiment is provided as follows.

As shown in FIG. 13, the rotating assembly 13 includes the rotating base 13-6, and the rotating base 13-6 is provided with a through-hole. The rotating assembly 13 further includes the rotating shaft 13-1, the shaft sleeve 13-2, the end cover 13-3, the washer 13-4, and the bolt 13-5 that are coaxially arranged with the through-hole in sequence. The washer 13-4 is fastened on the end cover 13-3 by the bolt 13-5 from the outer side. A convex structure and a concave structure are provided on the contact surface between the end cover 13-3 and the rotating shaft 13-2 and are engaged with each other. The washer 13-4 is mounted in the groove of the end cover 13-3. The rotating shaft 13-1 is fixed on the mounting plate 11, and the outer diameter of the rotating shaft 13-1 is equal to the diameter of the through-hole.

Figure 14:
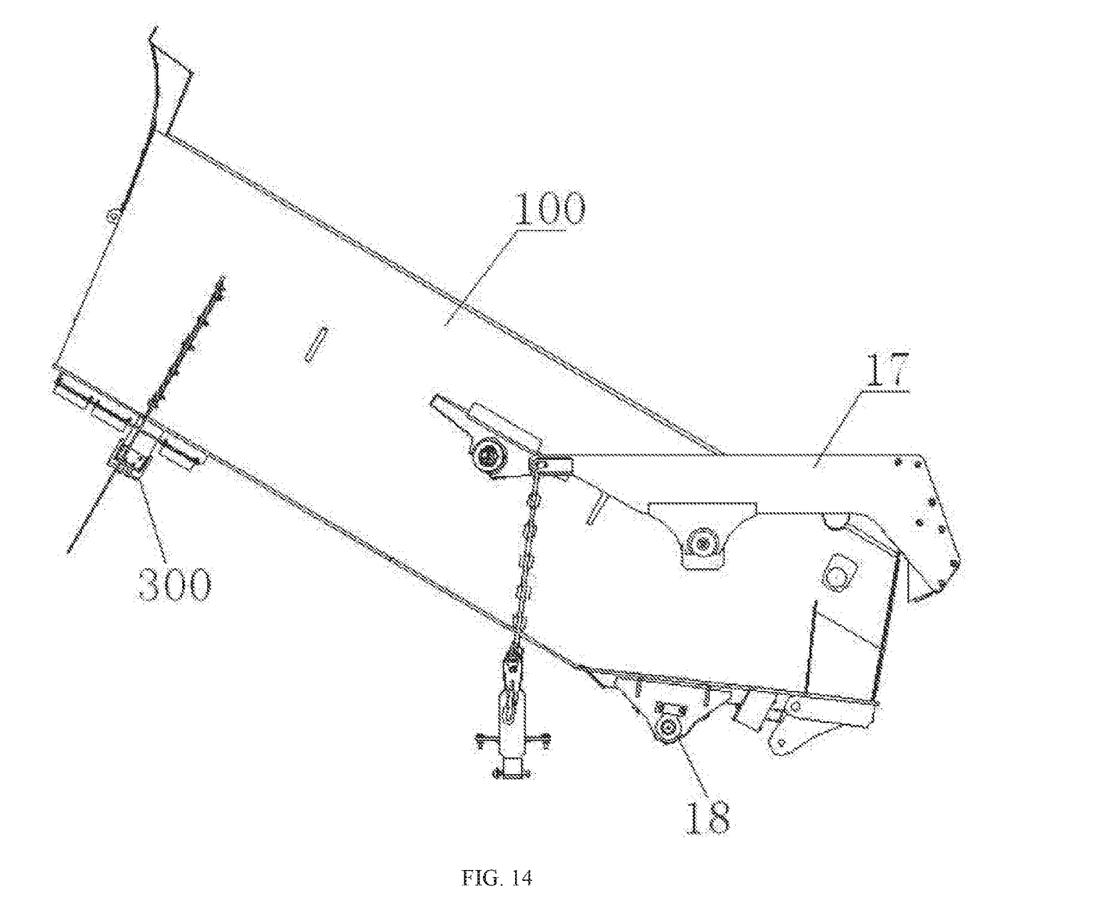
FIG. 14 is a schematic diagram showing the tipping position of the truck bed of the present disclosure.

As shown in FIG. 14, it can be seen that the tailgate device 17 is mounted at the rear of the truck bed. During the lifting process, the position of the U-shaped plate frame is limited by a lateral tensile force generated by a tilt angle of the two chains, and the opening between the U-shaped plate frame and the tail plate rapidly enlarges as the tipping angle of the truck bed changes, thereby improving the unloading speed of the dump truck.

The present disclosure further provides a dump truck, the dump truck includes the frame 200 on which the truck bed 100 in the foregoing embodiments is mounted.

It should be noted that the foregoing embodiments are only intended to illustrate the technical solution of the present disclosure rather than limiting the present disclosure. Although the present disclosure has been described in detail with reference to the preferred embodiments, those having ordinary skill in the art should understand that several modifications or equivalent replacements to the specific embodiments of the present disclosure or some technical features thereof without departing from the spirit of the technical solution of the present disclosure shall fall within the scope of protection of the technical solution of the present disclosure.

What is claimed is:

1. A tilting truck bed, comprising:
   a bed body, configured to load materials, wherein the bed body comprises a first bottom plate, a front plate, a tail plate, a left side plate, and a right side plate; and the front plate, the tail plate, the left side plate, and the right side plate are welded to an upper edge of the first bottom plate;
   lifting supports, symmetrically mounted on the tail plate and hinged to a frame to tip the bed body;
   shock absorber supports, symmetrically mounted on both sides of a front part of the first bottom plate, wherein each shock absorber support of the shock absorber supports comprises a shock absorber support main body and a gap adjusting device, and a first gap between the frame and the each shock absorber support is adjusted by the gap adjusting device to effectively control a lateral displacement generated by the truck bed during a running process; and
   a shock-absorbing pad assembly, mounted on the shock absorber supports to reduce an impact on the frame when the truck bed falls.

2. The tilting truck bed according to claim 1, wherein, each of the lifting supports comprises:
   a U-shaped plate, hermetically welded on an outer wall of the tail plate;
   two support bases, oppositely welded on both sides of the U-shaped plate;
   a shaft, inserted in the two support bases and bearings on the frame; and
   a fastening assembly, configured to limit the shaft in the two support bases.

3. The tilting truck bed according to claim 2, wherein, the fastening assembly comprises a fixing plate, a pressure plate, two screws, and two threaded bases;

the fixing plate is welded to one end of the shaft, and the two threaded bases are spaced apart and welded to each of the two support bases; after the shaft is inserted into the two support bases, a protrusion in the fixing plate is located between the two threaded bases, and the pressure plate is fastened to the two threaded bases by the two screws to limit the shaft in the two support bases; and after the pressure plate is mounted, a second gap between the pressure plate and the shaft is reserved to avoid a direct bearing force on the pressure plate by allowing a predetermined axial displacement of the shaft.

4. The tilting truck bed according to claim 1, wherein, the shock absorber support main body comprises a shock-absorbing pad mounting plate, a front vertical plate, a rear vertical plate, a side plate, a back plate, and a second bottom plate;

a rectangular hole is formed on the shock-absorbing pad mounting plate; the front vertical plate, the back vertical plate, the side plate, and the back plate are inserted into the rectangular hole of the shock-absorbing pad mounting plate to form an enclosed box-shaped support structure together with the second bottom plate, wherein the back plate faces the frame, and the side plate is parallel to the back plate; and the side plate is not in contact with the second bottom plate, and a third gap configured to assemble the gap adjusting device is reserved between the side plate and the second bottom plate.

5. The tilting truck bed according to claim 4, wherein, the gap adjusting device comprises a right-angled adjusting plate, an adjusting assembly, and a fastening assembly;

a first bending surface of the adjusting plate is located in front of the back plate, and a second bending surface of the adjusting plate is located below the second bottom plate; and after a fourth gap between the adjusting plate and the frame is adjusted by the adjusting assembly, an adjusting pad is filled between the first bending surface of the adjusting plate and the back plate, and the second bending surface of the adjusting plate is mounted on the second bottom plate by the fastening assembly.

6. The tilting truck bed according to claim 5, wherein, the fastening assembly comprises at least one fastening bolt, at least one fastening nut, and an oblong hole formed on the second bottom plate; and after the at least one fastening bolt successively passes through a through-hole on the adjusting plate and the oblong hole on the second bottom plate, a fifth gap between the adjusting plate and the back plate is adjusted, and the adjusting plate is fixed on the second bottom plate by the at least one fastening bolt matched with the at least one fastening nut.

7. The tilting truck bed according to claim 5, wherein, the adjusting assembly comprises at least one adjusting bolt and at least one adjusting nut; the at least one adjusting nut is welded on the back plate, and the fourth gap between the first bending surface of the adjusting plate and the frame is adjusted by screwing or unscrewing the at least one adjusting bolt in the at least one adjusting nut.

8. The tilting truck bed according to claim 1, wherein, a truck bed tailgate device is arranged at a tail of the bed body;

the truck bed tailgate device comprises a U-shaped plate frame, two chains, and two mounting bases; wherein the U-shaped plate frame comprises a first plate and two second plates, and the two second plates are symmetrically arranged;

a left second plate of the two second plates is hinged on the left side plate by a rotating assembly, and a right second plate of the two second plates is hinged on the right side plate by the rotating assembly;

the two mounting bases are symmetrically mounted on two sides of the bed body; a first end of each of the two chains is hinged to each of the two second plates by a shaft pin, and a second end of each of the two chains is hinged to each of the two mounting bases by a connecting plate; and during a lifting process, a lateral tensile force is generated by a tilt angle of the two chains to limit the U-shaped plate frame, and the materials are unloaded by changing a tipping angle of the truck bed.

9. The tilting truck bed according to claim 8, wherein, the rotating assembly comprises a rotating base mounted on the bed body, and the rotating base is provided with a through-hole; and the rotating assembly further comprises a rotating shaft, a shaft sleeve, an end cover, a washer, and a bolt, wherein the rotating shaft, the shaft sleeve, the end cover, the washer, and the bolt are arranged in sequence to be coaxial with the through-hole; the washer is fastened on the end cover by the bolt from an outer side; a contact surface between the end cover and the rotating shaft is provided with a convex structure and a concave structure, wherein the convex structure and the concave structure are engaged with each other; the washer is mounted in a groove of the end cover; the rotating shaft is fixed on a mounting plate, and an outer diameter of the rotating shaft is equal to a diameter of the through-hole.

10. A dump truck, comprising: the tilting truck bed according to claim 1.

11. The dump truck according to claim 10, wherein, each of the lifting supports comprises:

a U-shaped plate, hermetically welded on an outer wall of the tail plate;

two support bases, oppositely welded on both sides of the U-shaped plate;

a shaft, inserted in the two support bases and bearings on the frame; and a fastening assembly, configured to limit the shaft in the two support bases.

12. The dump truck according to claim 11, wherein, the fastening assembly comprises a fixing plate, a pressure plate, two screws, and two threaded bases;

the fixing plate is welded to one end of the shaft, and the two threaded bases are spaced apart and welded to each of the two support bases; after the shaft is inserted into the two support bases, a protrusion in the fixing plate is located between the two threaded bases, and the pressure plate is fastened to the two threaded bases by the two of screws to limit the shaft in the two support bases; and after the pressure plate is mounted, a second gap between the pressure plate and the shaft is reserved to avoid a direct bearing force on the pressure plate by allowing a predetermined axial displacement of the shaft.

13. The dump truck according to claim 10, wherein, the shock absorber support main body comprises a shock-absorbing pad mounting plate, a front vertical plate, a rear vertical plate, a side plate, a back plate, and a second bottom plate;

a rectangular hole is formed on the shock-absorbing pad mounting plate; the front vertical plate, the back vertical plate, the side plate, and the back plate are inserted into the rectangular hole of the shock-absorbing pad mounting plate to form an enclosed box-shaped support structure together with the second bottom plate, wherein the back plate faces the frame, and the side plate is parallel to the back plate; and the side plate is not in contact with the second bottom plate, and a third gap configured to assemble the gap adjusting device is reserved between the side plate and the second bottom plate.

14. The dump truck according to claim 13, wherein, the gap adjusting device comprises a right-angled adjusting plate, an adjusting assembly, and a fastening assembly;

a first bending surface of the adjusting plate is located in front of the back plate, and a second bending surface of the adjusting plate is located below a second bottom plate; and after a fourth gap between the adjusting plate and the frame is adjusted by the adjusting assembly, an adjusting pad is filled between the first bending surface of the adjusting plate and the back plate, and the second bending surface of the adjusting plate is mounted on the second bottom plate by the fastening assembly.

15. The dump truck according to claim 14, wherein, the fastening assembly comprises at least one fastening bolt, at least one fastening nut, and an oblong hole formed on a second bottom plate; and after the at least one fastening bolt successively passes through a through-hole on the adjusting plate and the oblong hole on the second bottom plate, the fourth gap between the adjusting plate and the back plate is adjusted, and the adjusting plate is fixed on the second bottom plate by the at least one fastening bolt matched with the at least one fastening nut.

16. The dump truck according to claim 14, wherein, the adjusting assembly comprises at least one adjusting bolt and at least one adjusting nut; the at least one adjusting nut is welded on the back plate, and a fifth gap between the first bending surface of the adjusting plate and the frame is adjusted by screwing or unscrewing the at least one adjusting bolt in the at least one adjusting nut.

17. The dump truck according to claim 10, wherein, a truck bed tailgate device is arranged at a tail of the bed body;

the truck bed tailgate device comprises a U-shaped plate frame, two chains, and two mounting bases; wherein the U-shaped plate frame comprises a first plate and two second plates, and the two second plates are symmetrically arranged;

a left second plate of the two second plates is hinged on the left side plate by a rotating assembly, and a right second plate of the two second plates is hinged on the right side plate by the rotating assembly;

the two mounting bases are symmetrically mounted on two sides of the bed body; a first end of each of the two chains is hinged to each of the two second plates by a shaft pin, and a second end of each of the two chains is hinged to each of the two mounting bases by a connecting plate; and during a lifting process, a lateral tensile force is generated by a tilt angle of the two chains to limit the U-shaped plate frame, and the materials are unloaded by changing a tipping angle of the truck bed.

18. The dump truck according to claim 17, wherein, the rotating assembly comprises a rotating base mounted on the bed body, and the rotating base is provided with a through-hole; and the rotating assembly further comprises a rotating shaft, a shaft sleeve, an end cover, a washer, and a bolt, wherein the rotating shaft, the shaft sleeve, the end cover, the washer, and the bolt are arranged in sequence to be coaxial with the through-hole; the washer is fastened on the end cover by the bolt from an outer side; a contact surface between the end cover and the rotating shaft is provided with a convex structure and a concave structure, wherein the convex structure and the concave structure are engaged with each other; the washer is mounted in a groove of the end cover; the rotating shaft is fixed on a mounting plate, and an outer diameter of the rotating shaft is equal to a diameter of the through-hole.

\* \* \* \* \*